(12) United States Patent
Onali

(10) Patent No.: US 6,858,143 B2
(45) Date of Patent: Feb. 22, 2005

(54) APPARATUS FOR THE BIOLOGICAL PURIFICATION OF WATER CONTAINING ORGANIC MATERIALS AND DERIVED PRODUCTS THEREOF

(76) Inventor: Giuliano Onali, Viale de Amicis 99-50137, Firenze (IT)

( * ) Notice: Subject to any disclaimer, the term of this patent is extended or adjusted under 35 U.S.C. 154(b) by 86 days.

(21) Appl. No.: 10/233,041

(22) Filed: Aug. 30, 2002

(65) Prior Publication Data

US 2004/0040900 A1 Mar. 4, 2004

(51) Int. Cl.[7] .................................................. C02F 3/30
(52) U.S. Cl. ........................ 210/605; 210/617; 210/150; 210/169; 119/260
(58) Field of Search ................................ 210/605, 615, 210/617, 610, 150, 151, 169; 119/259, 260

(56) References Cited

U.S. PATENT DOCUMENTS

| | | | | |
|---|---|---|---|---|
| 3,815,547 A | * | 6/1974 | Willinger et al. | 119/259 |
| 4,940,544 A | * | 7/1990 | Gode et al. | 210/610 |
| 4,995,980 A | | 2/1991 | Jaubert | 210/602 |
| 5,164,089 A | * | 11/1992 | Preston | 210/150 |
| 5,911,877 A | * | 6/1999 | Perez et al. | 210/150 |
| 6,387,265 B1 | * | 5/2002 | Hosoya | 210/617 |
| 6,428,691 B1 | * | 8/2002 | Wofford | 210/151 |

* cited by examiner

*Primary Examiner*—Christopher Upton
(74) *Attorney, Agent, or Firm*—Abelman, Frayne & Schwab

(57) ABSTRACT

The present invention refers to an apparatus for the biological treatment of waters, either fresh or salt waters, in aquarium and in basins for aquaculture, comprised of at least one reactor tank, where the water is treated by the action of aerobic and anaerobic microorganisms.

8 Claims, 1 Drawing Sheet

APPARATUS FOR THE BIOLOGICAL PURIFICATION OF WATER CONTAINING ORGANIC MATERIALS AND DERIVED PRODUCTS THEREOF

FIELD OF THE INVENTION

The present invention refers to an apparatus for the biological purification of water containing organic materials and derived products thereof.

STATE OF THE ART

Biological treatments of waters containing organic materials by means of microorganisms are well known in the art: the degradation of nitrogen compounds into ammonium, ammonia, nitrites, and finally nitrates, by means of aerobic microorganisms is a known process, used industrially to mineralize the organic nitrogen compounds present in domestic waste waters and in aquarium waters; the reduction of nitrates into molecular nitrogen by means of anaerobic microorganisms in the presence of an organic carbon source is also a known process for purifying waters.

For an effective performance it is known that the aerobic microorganisms have to be disposed in a medium enriched in oxygen, while the anaerobic microorganisms require a medium poor in oxygen and the presence of organic carbonaceous substances, which provides organic carbon to be reduced; moreover, the microorganisms have better to be fixed to support materials.

Finally, for both types of microorganisms, aerobic and anaerobic, it is necessary that the organic materials to be degraded enter into contact with the microorganisms, leaving then more or less rapidly the zone of treatment free for other material to be degraded in its turn. Therefore, in the biological purification processes developed until today the water to be treated is caused to come into contact with the microorganisms, then caused to circulate far from the zone where the degradation took place.

The known biological purification treatments generally carry out the aerobic and the anaerobic processes separately, in separate reactors having different oxygen concentrations. Nevertheless, some purification treatments are known, that allow a simultaneous and continuous action, in the same reactor, of the aerobic and anaerobic processes. For example, the European Patent No. 328 474 discloses a method for the biological treatment of water containing organic materials, in which the water to be treated circulates in the interior of a reactor, aerated and agitated by a diffuser; a certain volume of confined water, poor in oxygen, occupies the bottom of the reactor. Between these two zones the reaction space is interposed; it is constituted by a porous partition comprising, throughout its thickness, different contiguous reaction regions: a region rich in oxygen and containing aerobic microorganisms in contact with the water to be treated, a region poor in oxygen and containing anaerobic microorganisms, and an intermediate region containing a mixture of aerobic and anaerobic microorganisms. The essential characteristic of this apparatus is represented by the closed volume of confined water, poor in oxygen, which communicates only with the porous partition, and through this partition with the water to be treated.

SUMMARY OF THE INVENTION

Now the Applicant has developed an apparatus, which not only practices simultaneously and continuously, in the same reaction space, both types of degradation processes, aerobic and anaerobic, so to obtain a total purification of water containing organic materials but, thanks to its particular structure, favours the movements of gases and liquids making simpler all the operations for maintenance of the anaerobic region, and helps the emission in the atmosphere of $N_2$ and of the other gases coming from the purification, thus avoiding their contact with the water to be treated.

Object of the present invention is therefore an apparatus comprised of at least one reactor tank communicating only in the lowest part with the water to be treated through a perforated screen, from which the water goes up into the reactor by diffusion, said reactor tank comprising a layer of fibrous and/or porous materials and further comprising aerobic micro-organisms in the zone adjacent to the water to be treated and anaerobic micro-organisms in the upper zone.

Further objects of the present invention are the apparatus comprised of at least one vessel and at least one reactor tank immersed within said vessel or connected by pipes with said vessel, and the use of the apparatus and of the reactor tank in the biological purification of water containing suspended or dissolved organic substances, or dissolved substances derived from the degradation of said organic substances.

Features and advantages of the apparatus according to the present invention will be illustrated in detail in the following description.

DETAILED DESCRIPTION OF THE INVENTION

Figure 1:
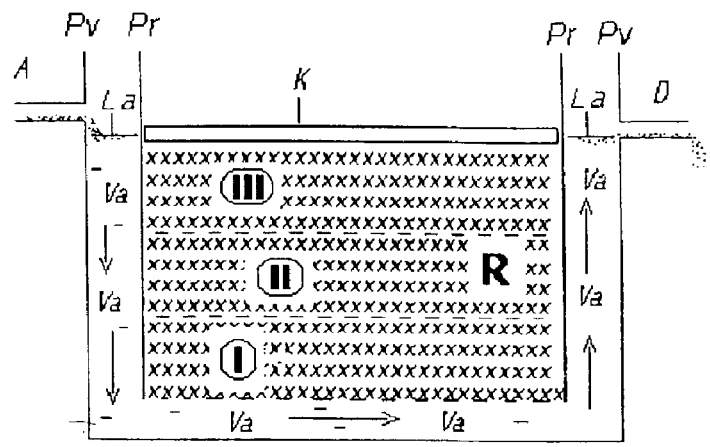
FIG. 1 is a sectional view illustrating schematically the apparatus in accordance with the present invention.

The present apparatus is comprised of a reaction structure having a particular conformation of great functionality, which helps the colonization and the development of the microorganisms responsible for the purification of water; consequently, the depuration process is complete and the drawbacks of an incomplete purification are avoided—in particular the compounds coming from incomplete denitrification processes—whose toxicity is high, even in low concentration.

In particular, the structure of the present apparatus helps the localization and growing of aerobic and anaerobic microorganisms, and favors the spontaneous movements of liquids and gases produced by the action of microorganisms. Moreover, the structure of the present apparatus, thanks to its form, makes simpler, in case of necessity, the maintenance of the apparatus. It is however worthy to note that the necessity of maintenance is very limited, thanks to the intrinsic properties of the apparatus. A prolonged stabilization of the chemical properties of water is obtained thanks to the particular composition of the substrate used for the colonization of microorganisms.

The apparatus of the invention may comprise a single vessel, or more than one vessel, which are connected in series and/or in parallel.

The purification of water may occur in a closed circuit, i.e. with a reactor connected through a pumping system to a vessel containing the water to be treated, or in an open circuit. In the first case the water flow, passing through the apparatus, may vary even a lot without compromising the efficiency of the purification. On the contrary, in the second case the water flow must be regulated so that from the last vessel only purified water comes out.

The present reactor tank R has been schematically represented in the drawings as a regular parallelepipeds, but this particular form is not critical for the good functionality of the apparatus of the invention, which may be comprised of a reactor manufactured in different forms, symmetric or asymmetric, spherical, cubic, pyramidal, cylindrical, etc.

Any form of the reactor tank can be suitable for practicing the present invention, provided that in the interior of the reactor the diffusion of the fluids upwards occurs, and at least two zones can be discernible: a layer adjacent to the water to be treated occupied by the aerobic microorganisms, and an upper layer containing a low concentration of oxygen occupied by anaerobic microorganisms.

The reactor tank R is placed within the vessel, or in communication by pipes with the vessel, in a such way that the following requirements have been met:
  the greatest quantity of water to be treated comes into contact with the inferior part of the reactor;
  the contact between the inferior part of the reactor tank and the water to be treated is prolonged:
  the level of water is stable, thus avoiding sudden movements of the water contained in the reactor.

The present reactor tank R comprises a substrate to be colonized by the microorganisms. The material in the inner part of the reactor tank R acts as a substrate for the microorganisms responsible for the biological purification; according to the present invention it can be fibrous or porous material able to guarantee an optimal colonization of the microorganisms in the different zones of the reactor. According to the present invention materials having different granulometry and different chemical characteristics may be used; moreover, the granulometry and the chemical characteristics of the materials may be uniform in the whole thickness of the biologically active layer, or may vary according to the location of the material in the layer and of the type of water to be treated.

The fibrous or porous material used as support for the microorganisms in the present apparatus can be for example sand, gravel, expanded clay, or a synthetic material produced to be suitable as a support for the specific microorganisms utilized. The said material may be a chemically inert material or a calcareous material having a buffer effect and a stabilizing action on the pH values of water, which tend to decrease due to the formation of organic acids and nitric acid following to the biological degradation; as the present support material can be also used a mixture of a chemically inert material and a chemically active calcareous material.

According to a particular embodiment of the present invention, the reactor tank R comprises at least three distinct zones:
I) a zone in contact with the water to be treated, rich in oxygen, composed of a material having a high porosity and a medium to high granulometry, chemically inert; it is the ideal support for aerobic microorganisms;
II) an intermediate zone composed of a material having a high porosity and a medium to small granulometry, chemically inert or with low activity; it is the ideal support for aerobic as well as for anaerobic microorganisms;
III) a zone positioned between the intermediate zone II and a partition K, which divides the reactor tank from the atmosphere; it is composed of a chemically active material, which dissolves in contact with the acids coming from the biological degradation which takes place in this zone and in the preceding zones of the reactor, and acts as a buffer releasing calcium ions and other substances useful for the stabilization of water. For the preparation of this substrate may be used for example a material of natural origin, such as coral sand, crushed seashells and coral, Foraminiferida sand, aragonite, and mixtures thereof, optionally enriched with micronutrients.

In the above particular embodiment the zones I and II in the reactor tank R are essentially composed of chemically inert material, thus avoiding the compaction events that occur when calcareous materials are used: namely organic acids coming from degradation induce the dissolution of the calcareous substances.

This progressive and significant dissolution of the calcareous substances in the present zone III is however wanted in order to obtain the positive buffer and stabilizing effect on the pH values of water. The buffer capacity of the substances has obviously to be suitable for the type of water to be treated.

It is moreover worthy to note that, thanks to the particular structure of the present apparatus, the maintenance operations for the addition, and for the partial or total substitution of the material in the upper zone III are particularly simple to carry out.

In order to further facilitate the maintenance operations in this zone, this zone III substrate may be internally structured with one or more cells separated from each other by a vertical partition, to dilute the addition and the substitution of the calcareous material.

According to the present invention the material in the interior part of the reactor tank is maintained from falling down by means of a screen, which is perforated so to permit the water to pass through and go up in the interior part of the reactor, where the purification occurs. Impermeable walls delimit the reactor tank on its sides.

In the upper part of the reactor tank a partition is placed with the aim of separating the anaerobic zone of the reactor from the atmosphere: the partition, indicated in the drawings as K, ensures a low quantity of oxygen in the upper zone of the reactor tank, and may be comprised of:
i) a fixed partition, made of an impermeable material and provided with holes which are closed by means of materials whose permeability depends on the specific needs, and they can be opened for the maintenance of the layer below;
ii) a movable partition, floating on the surface of water in the reactor, made of a material impermeable to the air;
iii) a layer of a material having a very small granulometry, which limits the exchange of gas between the interior part of the reactor and the atmosphere; or a combination of two partitions chosen among the three types of partitions described above.

The purification process practiced by the present apparatus may be described as follows: the water to be treated, abundant in oxygen and organic materials, enters the present apparatus by an appropriate opening and comes into contact with the lower surface of the reactor tank, wherein the aerobic microorganisms present in this area convert the organic substances contained in water into ammonium, ammonia, nitrites, and then nitrates. These products, without being forcing, by the means of spontaneous diffusion only, rise into the internal areas of the apparatus which contain ever less oxygen until the higher part of the apparatus is reached, wherein the concentration of oxygen is very low.

To the progressive decrease of oxygen corresponds a progressive decrease of aerobic microorganisms and a simultaneous increase of anaerobic microorganisms approaching the higher zone of the apparatus, which is very poor in oxygen, and in which the anaerobic microorganisms prevail.

To the differentiate stratification of oxygen and different population of microorganisms correspond a different degradation process of the organic compounds in the water to be treated: from the bottom to the top of the apparatus, the progressive conversion of nitrogen organic substances occurs into ammonium, ammonia, nitrites and nitrates until molecular nitrogen, which may diffuse through the inert partition K. The fluids move by diffusion only, and this allows to use organic compounds—such as the carbonaceous substances necessary for the denitrification by anaerobic micro-organisms—diluted in the water to be treated.

Through the same partition the exit of other substances, which could accidentally form following malfunction of the depuration process deriving from external events, such as the toxic hydrogen sulfide, so that they do not come into contact with the water to be treated anymore.

The use of specific chemically active materials as support for microorganisms allows the stabilization of the changes in the pH values caused by the degradation processes in a natural way. Therefore, the present apparatus besides the purification of water, provides also their physical-chemical stabilization.

The lack of a forcing system for the liquid in the present apparatus guarantees the lack of a "contamination by return" of the compounds not completely converted from nitrates into molecular nitrogen. The movements of the substances occurs therefore in times compatible with the action of the microorganisms, and help the natural colonization of the ideal quantities of the microorganisms according to the requests of conversion for the compounds in the different zones of the apparatus.

The use of the material of support for the microorganisms, containing calcareous material in various proportions, allows a buffer effect with respect to the organic acids produced by the degradation processes, and stabilizes the pH of water.

The apparatus of the invention may be successfully used for the treatment of aquarium waters, in particular household aquarium, either of fresh or salt water, and for the purification of basins in aquaculture. In general, the present apparatus may be used for the purification of water containing organic substances.

Furthermore, the present apparatus may be advantageously used for the purification of waters having sudden and high levels of organic materials, by providing the reactor tank with an additional compartment for storing the organic materials and making constant the quantity of organic material to be removed.

In this case, it would be useful to add carbon organic substances, so to guarantee a constant efficiency of the anaerobic microorganisms, which usually utilize for the denitrification process the carbon substances contained in the water to be treated. Hereinafter specific embodiments of the apparatus according to the present invention are described with reference to the drawings for better illustrating the invention, without in any way limiting it:

FIG. 1 shows a section illustrating schematically an apparatus of the invention, in which the water to be treated, rich of oxygen, whose level is represented by $L_a$ and the volume by $V_a$, enters the apparatus by the opening A.

The water moves in the direction indicated by the arrow along the lines $P_r$ and $P_v$, which represent respectively the wall of the reactor and the wall of the vessel.

R indicates the reactor tank having a horizontal partition K at the interface with the atmosphere. The reactor tank R is constituted by the fibrous or porous material which acts as a support for the microorganisms; in this embodiment in R are indicated three distinct zones: the zone I prevalently occupied by aerobic microorganisms and in contact with the water to be treated by means of a perforated screen; the intermediate zone II occupied by aerobic and anaerobic microorganisms; and the zone III prevalently colonized by anaerobic microorganisms. The purified water leaves the apparatus by the opening D.

Figure 2:
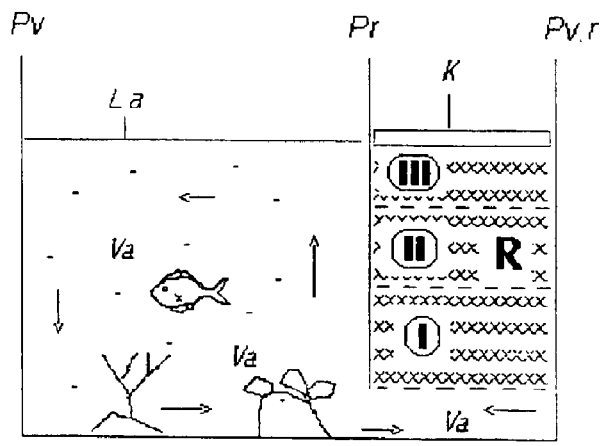
FIG. 2 is an installation of a reactor tank in accordance with the present invention directly within an aquarium.

FIG. 2 shows the installation of a reactor tank of the invention directly within an aquarium. In this embodiment, the aquarium water to be treated comes into contact with the inferior part of the reactor tank by its normal movements. If necessary, by means of a pumping system or air diffuser, the quantity of oxygen may be increased in the contact zone between the water to be treated and the reactor.

Figure 3:
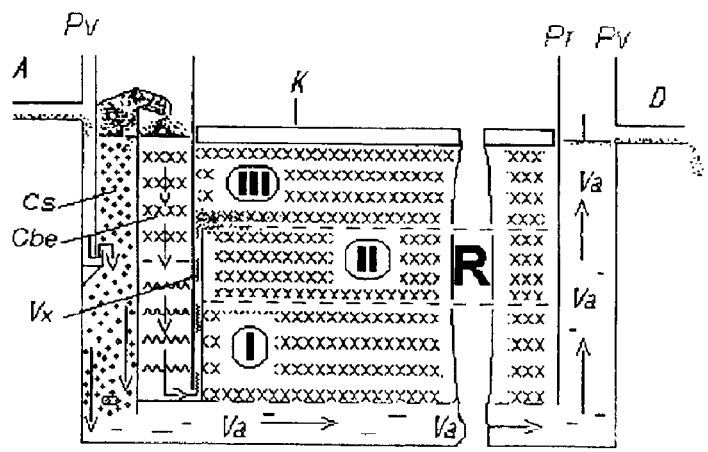
FIG. 3 is a sectional view schematically illustrating a particular embodiment of the apparatus of the present invention which is particularly suited for the treatment of waters having a temporarily high level of organic materials.

FIG. 3 shows a section schematically illustrating a particular embodiment of the present apparatus, particularly suitable for the treatment of waters having temporary high level of organic materials. This embodiment provides two additional compartments: $C_s$ indicates the skimming compartment and $C_{be}$ the biological compartment for temporary high level of organic materials; a volume $V_x$ of water, poor in oxygen and partially purified, leaves the compartment $C_{be}$ and enters the zone II/III of the reactor tank.

This particular embodiment the water containing a high level of organic material is directed to the compartment Cbe, for example by the means of an air flow, which causes the skimming of the material in excess in the compartment Cbe. The air flow is regulated so that the normal performance of the apparatus is not disturbed. This compartment Cbe comprises fibrous and/or porous materials occupied by aerobic micro-organisms, where the water stays for a prolonged time and undergoes the nitrification process of the nitrogen substances. From here the water is directed into the zone II/III of the reactor tank, wherein the purification is completed. The slow flow of water from the compartment Cbe is forced to the zone II/III of the reactor, and this could disturb the spontaneous movements of the fluids in the internal part of the reactor tank. The maximum quantity of water introduced in the compartment Cbe is therefore regulated according to the internal volume of the reactor and to its composition.

In this particular embodiment of the present apparatus any possible lack of the carbonaceous substance useful for the anaerobic denitrification may be easily opposed by adding such substances in the upper part of the zone III of the reactor tank.

In the case of more than one reactor in series, the compartment Cbe is placed before the first reactor. If the reactors are in parallel, all reactors have a compartment Cbe.

The particular structure of the present reactor tank, having a vertical development with the lower zone in contact with the water to be treated rich in oxygen and the upper zone poor in oxygen and separated from atmosphere by a partition as described above, shows many advantages which can be summarized herein below:

the fluids move only by diffusion, so that the substances coming from degradation move upwards in times which are in accord with the times requested by the microorganisms to act efficiently, and the organic substances diluted in the water to be treated can be used by the anaerobic microorganisms for denitrification instead of adding organic carbonaceous substances from the outside of the reactor tank;

thanks to the fact that the fluids move through the reactor tank only by diffusion, the "contamination by return" of the water to be treated with the substances still not completely converted from nitrates into molecular nitrogen is avoided;

the spontaneous movements of the fluids only by diffusion do not require the operations of external regulation, apart from exceptional cases of malfunctions by wrong handling;

the structure of the reactor tank makes simpler the maintenance of the anaerobic zone and, in the case of necessity, the possible addition of organic carbonaceous substances in the anaerobic zone;

the use of specific chemically active materials as support for microorganisms allows the stabilization of the changes in the pH values caused by the degradation processes in a natural way.

What is claimed is:

1. An apparatus for the biological purification of water comprised of at least one reactor tank delimited by impermeable walls on the lateral sides, separated from the atmosphere by a partition and communicating only in the lowest part with the water to be purified through a perforated screen, from which the water goes up into the reactor by diffusion, said reactor tank comprising at least one layer of fibrous and/or porous materials that act as support for micro-organisms, at least two zones being discernible in said at least one layer, a zone adjacent to the water to be purified containing aerobic micro-organisms and an upper zone containing anaerobic micro-organisms.

2. The apparatus according to claim 1, wherein said reactor tank comprises at least three zones:

I) a zone I in contact with the water to be treated, rich in oxygen and occupied by aerobic microorganisms;

II) an intermediate zone II occupied by both anaerobic and aerobic microorganisms; and III) a zone III positioned between the intermediate zone II and said partition, and occupied by anaerobic microorganisms.

3. The apparatus according to claim 2, wherein said zone I is composed of a chemically inert material acting as a substrate for the said aerobic microorganisms.

4. The apparatus according to claim 2, wherein said zone III is composed of a chemically active material of natural origin consisting of calcareous substances, acting as a substrate for said anaerobic microorganisms.

5. The apparatus according to claim 4, wherein said chemically active material of natural origin consisting of calcareous substances is enriched with micronutrients.

6. The apparatus according to claim 2, further comprising an additional compartment for storing peaks of organic materials occasionally present in the water to be purified, said compartment comprising fibrous and/or porous materials colonized by aerobic micro-organisms, where the water containing high levels of organic materials undergoes a partial purification before entering zones II and III of the reactor tank wherein purification is completed.

7. An apparatus for the biological purification of water comprised of at least one vessel and at least one reactor tank as claimed in claim 1 immersed within said vessel so that the water to be treated comes into contact with the lowest part of said reactor tank.

8. A process for the biological purification of water containing suspended or dissolved organic substances, or dissolved substances derived from the degradation of said organic substances, employing an apparatus comprised of at least one reactor tank delimited by impermeable walls on the lateral sides, separated from the atmosphere by a partition and communicating only in the lowest part with the water to be purified through a perforated screen, from which the water goes up into the reactor by diffusion which comprises providing said reactor tank with at least one layer of fibrous and/or porous materials that act as support for micro-organisms, at least two zones being discernible in said at least one layer, a zone adjacent to the water to be purified containing aerobic micro-organisms and an upper zone containing anaerobic micro-organisms.

* * * * *